April 6, 1926.
G. GLAUDE
1,579,647
PROCESS FOR THE SYNTHESIS OF AMMONIA
Filed April 5, 1921
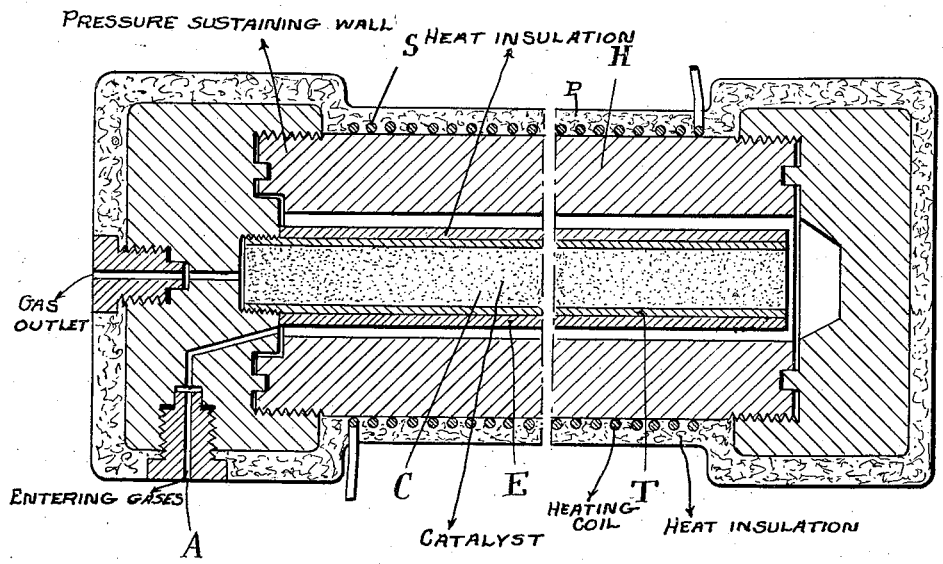
Inventor
Georges Claude
By his Attorneys Patented Apr. 6, 1926.

1,579,647

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

PROCESS FOR THE SYNTHESIS OF AMMONIA.

Application filed April 5, 1921. Serial No. 458,848.

*To all whom it may concern:*

Be it known that I, GEORGES CLAUDE, a citizen of the Republic of France, residing at Paris, France, have invented certain new and useful Improvements in Processes for the Synthesis of Ammonia; and I do hereby declare the following to be a full, clear, and exact description of the invention, such as will enable others skilled in the art to which it appertains to make and use the same.

This invention relates to the improvement of operating conditions of the process of producing ammonia by combination of nitrogen and hydrogen in the presence of a catalyzing material and at high temperatures and hyper-pressures. The object of the invention more particularly is to avoid certain difficulties presented by reason of the release of heat during the reaction in such quantity as to raise the temperature of the apparatus beyond a point which permits safe operation. The invention provides a material improvement in this respect and insures the continuous operation of the apparatus, particularly of large size, whereby the commercial application of the process is facilitated.

Further objects and advantages of the invention will be apparent as it is better understood by reference to the following specification and accompanying drawing which illustrates in section a preferred form of the apparatus adapted for use in practicing the improved process.

It is known that in the direct synthesis of ammonia under the combined action of elevated pressures preferably above 400 atmospheres, and called hyper-pressures, and of high temperature in the presence of a catalytic material, the heat released by the reaction has to be removed from the reaction zone to avoid great elevation of temperature in the reacting gases which would be disadvantageous to the reaction. At the same time, it is necessary that the walls of the reaction chamber which support the pressure should preserve in spite of the relatively high temperature of the operation mechanical qualities sufficient for them to resist the very high pressures to which they are internally subjected.

In an application for Letters Patent Serial No. 317,322, a method has been described whereby the double requirement mentioned may be met. The essential idea of that application consists in profiting by the presence of the surplus heat to accomplish its discharge as rapidly as possible and in the quantity in which it is produced across the wall of the reaction chamber. The flow of heat is accompanied in the body of the wall by a fall of temperature from the interior to the exterior, and the fall of temperature maintains at least the exterior layers of the wall at a temperature at which its mechanical resistance is still sufficient to sustain the pressure. This direct evacuation of heat from the space where it is released, effectuated by the suitable exterior cooling of the same wall, has the advantage of preserving the solidity of the wall.

While this procedure gives in practice very interesting results and is practicable in apparatus of a small size, it is possible to have in certain cases and particularly in large apparatus provided with thick walls to sustain the pressure, some inconveniences, for example, that of accompanying explosions of tubes, in spite of the fact that these tubes appear to be entirely capable by reason of their mechanical and chemical characteristics of resisting the conditions of interior pressure and temperature to which they are subjected. This difficulty may be overcome, as has been determined in accordance with the present invention, by discarding the principle of operation referred to heretofore. It may be stated, in fact, that the catalytic tubes employed will resist the conditions referred to if, instead of favoring the escape of heat at the exterior surface of the catalytic tube as appears desirable from the foregoing discussion, we oppose this escape by means such as heat insulation placed exteriorly of the tube. This conception leads then in the direction of preserving the tubes by the paradoxical means of aggravating the conditions of temperature to which the tubes are subjected, whereby all of the mass of metal, without excepting even the exterior layers, is uniformly subjected to the high temperature of the gas in contact with the interior surface.

While the primary object is the avoidance of thermal evacuation across the pressure-sustaining wall, it is preferable, if the results are to be always good, to avoid rapid changes of condition, so far as it is possible, by means which will be easily understood.

It is to be understood, moreover, since the wall is not to be utilized, for conducting away the heat of reaction, it will be necessary to have recourse to other processes exclusively to absorb the heat at the interior of the chamber. For example, a progressive mixture of cold gas with the gas brought in through the exchanger of temperature and having already reacted as indicated in the application Serial No. 408,940, might be employed to the exclusion of the elimination of heat through the wall.

Referring to the accompanying drawing, the single figure represents, by way of example, a mode of execution embodying the heat insulation of the reaction chamber with the means of absorbing the heat indicated in the application Serial No. 451,765, for improvements in the synthesis of ammonia. In this structure, H is the catalyzer tube of a special alloy of nickel, chromium and iron containing, for example, about 60% of nickel, about 10% of chromium, and about 26% of iron, the balance consistsing of the impurities usually present in these metals, arranged for example, horizontally, and provided with an insulating envelope. Within the insulation, an electrical resistance S is arranged for heating. The gaseous mixture compressed to about 1000 atmospheres circulates from the inlet A to the apparatus about the thin-walled tube T, filled with the catalyzing material C and surrounded by suitable heat insulation E, for example asbestos, enamel or a vitreous lining of boric acid, covered by a layer P of asbestos. The gas is heated then by the heat of reaction. With a suitable insulation, the transmission of heat across the wall T could be such that it ensures arrival of the reacting gas on the catalyzing material at the lowest temperature commensurate with the normal maintenance of the reaction, thus lowering to a minimum the temperature to which the wall of the chamber H is subjected, at the same time that the exterior insulation reduces to the minimum the effect of this temperature on the metal of which the chamber H is constructed.

In such a system where there are practically slight losses of heat, the gas will leave at a temperature which corresponds to the temperature of combination. Moreover, if we operate under higher pressure, the conditions of operation are such that this temperature, and particularly with very active catalyzers, will pass 400° C., that is to say, approach or pass the temperature at which these catalyzers still function.

The heat insulation T is, of course, proportioned to the size of the apparatus and to the quantity of gas employed.

From the foregoing, it will be observed that the relatively simple expedient employed unexpectedy results in an advantage which is of considerable importance, particularly when large scale commercial operations are contemplated. The synthetic production of ammonia may in accordance with the invention be practiced with safety and economy and without resort to more or less complicated means to prevent weakening of the pressure-sustaining wall.

Various changes may be made in the details of the method and in the apparatus employed without departing from the invention or sacrificing any of the advantages thereof.

I claim:

1. In the direct synthesis of ammonia, the process which comprises causing hydrogen and nitrogen to react within a chamber, eliminating the heat generated by the reaction while maintaining the metallic pressure-resisting wall of the chamber at a uniform temperature.

2. In the direct synthesis of ammonia, the process which comprises causing hydrogen and nitrogen to react within a chamber, eliminating the heat generated by the reaction while subjecting the metallic pressure-resisting wall of the chamber to a temperature substantially equal to that of the gases undergoing reaction.

3. In the direct synthesis of ammonia, the process which comprises causing hydrogen and nitrogen to react within a chamber, eliminating the heat generated by the reaction while subjecting to the heat generated by the reaction the metallic pressure-resisting wall of the chamber and submitting the external surface of the wall to a temperature somewhat higher than that of the internal surface.

4. In the direct synthesis of ammonia, the process which comprises causing hydrogen and nitrogen to react within a chamber, eliminating the heat generated by the reaction while insulating externally the metallic pressure-resisting wall of the chamber and slightly heating the external surface of the wall, this heat being eliminated in the interior of the chamber.

5. In the direct synthesis of ammonia, the process which comprises supporting the pressure of the reaction by a wall which is maintained at substantially the temperature of the gases undergoing reaction and eliminating the excess heat only through the gases withdrawn from the reaction.

In testimony whereof I affix my signature.

GEORGES CLAUDE.